United States Patent
Brockway et al.

(10) Patent No.: US 11,592,246 B2
(45) Date of Patent: Feb. 28, 2023

(54) NANOSTRUCTURE COATING MATERIALS AND METHODS OF USE THEREOF

(71) Applicant: Nelumbo Inc., Hayward, CA (US)

(72) Inventors: Lance R. Brockway, Hayward, CA (US); David C. Walther, Hayward, CA (US)

(73) Assignee: Nelumbo Inc., Hayward, CA (US)

( * ) Notice: Subject to any disclaimer, the term of this patent is extended or adjusted under 35 U.S.C. 154(b) by 133 days.

(21) Appl. No.: 16/334,337

(22) PCT Filed: Sep. 19, 2017

(86) PCT No.: PCT/US2017/052120
§ 371 (c)(1),
(2) Date: Mar. 18, 2019

(87) PCT Pub. No.: WO2018/053453
PCT Pub. Date: Mar. 22, 2018

(65) Prior Publication Data
US 2019/0366381 A1    Dec. 5, 2019

Related U.S. Application Data

(60) Provisional application No. 62/397,319, filed on Sep. 20, 2016, provisional application No. 62/396,728, filed on Sep. 19, 2016.

(51) Int. Cl.
*F28F 13/18* (2006.01)
*B05D 5/02* (2006.01)
(Continued)

(52) U.S. Cl.
CPC .............. *F28F 13/187* (2013.01); *B05D 1/18* (2013.01); *B05D 1/38* (2013.01); *B05D 3/065* (2013.01);
(Continued)

(58) Field of Classification Search
CPC ........ B05D 1/18; B05D 1/38; B05D 2202/25; B05D 2350/63; B05D 2401/20;
(Continued)

(56) References Cited

U.S. PATENT DOCUMENTS 8,540,889 B1    9/2013  Hartlove et al.
9,147,633 B2    9/2015  Eid et al.
(Continued)

FOREIGN PATENT DOCUMENTS

CN    201575646 U    9/2010
CN    102748987 A    10/2012
(Continued)

OTHER PUBLICATIONS

Wang et al., In situ growth of hierarchical boehmite on 2024 aluminum alloy surface as superhydrophobic materials, RSC Adv., 2014, 4, 14708.*
(Continued)

*Primary Examiner* — James M Mellott
(74) *Attorney, Agent, or Firm* — FisherBroyles, LLP; Jill A. Jacobson

(57) ABSTRACT

Nanostructured coating materials, methods of their production, and methods of use in a variety of applications are described. The nanostructured materials described herein include one or more $2^+$ and/or $3^+$ metal ion(s), optionally in a ternary phase, on a substrate.

14 Claims, 6 Drawing Sheets

(51) Int. Cl.

| | | |
|---|---|---|
| C03C 17/42 | (2006.01) | |
| C03C 17/25 | (2006.01) | |
| B05D 1/18 | (2006.01) | |
| B05D 1/38 | (2006.01) | |
| B05D 3/06 | (2006.01) | |
| B05D 3/10 | (2006.01) | |
| B05D 3/12 | (2006.01) | |
| B05D 7/14 | (2006.01) | |
| B05D 7/00 | (2006.01) | |
| C23C 18/12 | (2006.01) | |
| B82Y 40/00 | (2011.01) | |
| B82Y 30/00 | (2011.01) | |

(52) U.S. Cl.
CPC ............ *B05D 3/102* (2013.01); *B05D 3/12* (2013.01); *B05D 5/02* (2013.01); *B05D 7/14* (2013.01); *B05D 7/50* (2013.01); *B05D 7/52* (2013.01); *C03C 17/25* (2013.01); *C03C 17/42* (2013.01); *B05D 2202/25* (2013.01); *B05D 2350/63* (2013.01); *B05D 2401/20* (2013.01); *B05D 2506/15* (2013.01); *B82Y 30/00* (2013.01); *B82Y 40/00* (2013.01); *C03C 2217/75* (2013.01); *C23C 18/1216* (2013.01); *C23C 18/1241* (2013.01); *C23C 18/1254* (2013.01); *C23C 18/1283* (2013.01); *F28F 2245/02* (2013.01); *F28F 2245/04* (2013.01)

(58) Field of Classification Search
CPC ............ B05D 2506/10; B05D 2506/15; B05D 2518/10; B05D 3/065; B05D 3/102; B05D 3/12; B05D 5/02; B05D 5/08; B05D 7/14; B05D 7/50; B05D 7/52; B82Y 30/00; B82Y 40/00; C03C 17/25; C03C 17/42; C03C 2217/75; C23C 18/1216; C23C 18/1241; C23C 18/1254; C23C 18/1283; F28F 13/187; F28F 2245/02; F28F 2245/04

See application file for complete search history.

(56) References Cited

U.S. PATENT DOCUMENTS

| | | |
|---|---|---|
| 9,362,201 B2 | 6/2016 | Gavillet et al. |
| 2004/0055892 A1 | 3/2004 | Oh et al. |
| 2004/0118698 A1 | 6/2004 | Lu et al. |
| 2006/0141268 A1 | 6/2006 | Kalkan et al. |
| 2010/0099012 A1 | 4/2010 | Adzic |
| 2010/0203287 A1 | 8/2010 | Jiang et al. |
| 2010/0252241 A1 | 10/2010 | McDermott |
| 2010/0294475 A1 | 11/2010 | Rush |
| 2011/0039972 A1 | 2/2011 | Kuehnle |
| 2011/0198059 A1 | 8/2011 | Gavillet et al. |
| 2011/0253007 A1 | 10/2011 | Zastrau et al. |
| 2012/0231290 A1 | 9/2012 | Ho et al. |
| 2012/0328505 A1 | 12/2012 | Frei |
| 2013/0244001 A1 | 9/2013 | Wang et al. |
| 2013/0330501 A1 | 12/2013 | Aizenberg |
| 2014/0011013 A1 | 1/2014 | Jin et al. |
| 2014/0017456 A1 | 1/2014 | Xiao et al. |
| 2014/0178641 A1 | 6/2014 | LeBlanc |
| 2014/0182790 A1 | 7/2014 | Hwang et al. |
| 2014/0208978 A1 | 7/2014 | Sunder et al. |
| 2014/0231052 A1 | 8/2014 | Takasawa et al. |
| 2014/0238646 A1 | 8/2014 | Enright |
| 2014/0247556 A1 | 9/2014 | Eid |
| 2015/0175317 A1 | 6/2015 | Imai |
| 2016/0068703 A1 | 3/2016 | Schmidt et al. |
| 2016/0097606 A1 | 4/2016 | Xiao et al. |
| 2017/0282416 A1 | 10/2017 | Kim et al. |

FOREIGN PATENT DOCUMENTS

| | | |
|---|---|---|
| CN | 103173832 A | 6/2013 |
| CN | 104451814 A | 3/2015 |
| CN | 105776125 A | 7/2016 |
| CN | 105776317 A | 7/2016 |
| EP | 2752504 B1 | 4/2016 |
| WO | 2014/012052 A1 | 1/2014 |
| WO | 2017/031391 A1 | 2/2017 |
| WO | 2018/053452 A1 | 3/2018 |
| WO | 2018/053453 A1 | 3/2018 |
| WO | 2018/132519 A1 | 7/2018 |

OTHER PUBLICATIONS

Zhao et al., CoMn-layered double hydroxide nanowalls supported on carbon fibers for high-performance flexible energy storage devices, J. Mat. Chem. A, 2013, 1, 8836.*
Adv. Funct. Mater. 2008, 18 1448-1458.*
Metals 2016, 6, 85; published Apr. 13, 2016.*
J. Mater. Chem. A, 2013, 1, 7167.*
J. Phys. Chem. B 2006, 110, 21865-21872; hereafter Liu 2006.*
Adv. Funct. Mater. 2008, 18 1448-1458; hereafter Liu 2008.*
Kang, S.M., et al., Directional Oil Sliding Surfaces with Hierarchical Anisotropic Groove Microstructures, Aug. 5, 2013, Adv Mater 25(40):5756-5761.
Futeja, A., et al., Design Parameters for Superhydrophobicity and Superoleophobicity, Jan. 1, 2011, MRS Bulletin 33 (8):752-758.
Lv, Y., et al., Fabrication of Superhydrophobic Films on Aluminum Foils with Controllable Morphologies, Adv. Mat. Res. 641-642:414-417, Jan. 11, 2013.
Miljkovic, N., et al., Jumping-Droplet-Enhanced Condensation on Scalable Superhydrophobic Nanostrutured Surfaces, 2013, Nano Lett., 13(1):179-187.
Miljkovic, N., et al., Modeling and Optimization of Superhydrophobic Condensation, 2013, J. Heat Transf.-Trans., ASME 135:14.
Miljkovic, N., et al., Condensation heat transfer on superhydrophobic surfaces, 2013, MRS Bull. 38:397-406.
Aili, A., et al., Characteristics of Jumping Droplet-Enhanced Condensation on Nanostructured Micromesh Surface, 2016, ASME 2016 5th International Conference on Micro/Nanoscale Heat and Mass Transfer, V001T004A001.
Mozalev, A., et al., The superhydrophobic properties of self-organized microstructured surfaces derived from anodically oxidized Al/Nb and Al/Ta metal layers, 2012, Electrochimica Acta 82:90-97.
Zhao, J., et al., CoMn-layered double hydroxide nanowalls supported on carbon fibers for high-performance flexible energy storage devices, 2013, J. Mater. Chem. A, 1:8836-8843.
Chen, H., et al., Hydroxide Monolayer Films with Curved Hexagonal Crystals as Superhydrophobic Materials, 2006, Adv. Mater. 18:3089-3093.
Liu, J., et al., Facile and Large-Scale Production of ZnO/Zn—Al Layered Double Hydroxide Hierarchical Heterostructures, 2006, J. Phys. Chem. B 110:21865-21872.

* cited by examiner

NANOSTRUCTURE COATING MATERIALS AND METHODS OF USE THEREOF

CROSS-REFERENCE TO RELATED APPLICATIONS

This application is a U.S. national phase application under 35 U.S.C. § 371 of PCT/US2017/052120, filed Sep. 19, 2017, which claims the benefit of U.S. Provisional Application Nos. 62/396,728, filed Sep. 19, 2016, and 62/397,319, filed Sep. 20, 2016, both of which are incorporated by reference herein in their entireties.

FIELD OF THE INVENTION

The invention relates to nanostructured coating materials and methods for their production and use.

BACKGROUND

Surface modification technologies have been employed for use in a variety of fields for many years. Many of these applications employ an intermediate layer to improve the durability of the coating. A classic example is the use of primer to clean and treat the substrate prior to painting.

Modern coating systems, such as painting, powder coating, plating and the application of other coating materials, are designed for aesthetics, corrosion resistance, cleanability and many other features of interest. The application of these coatings can be carried out using a variety of methods including contact painting (brush), spray painting, dip coating, and roller coating, to name a few. The common trait among these is to ensure a good adhesion of the desired coating to the substrate. In order to do this, typically large loose debris is removed, surface dirt and grime are removed with a cleaning step, a surface treatment is applied, and a final coating is applied in one or more steps. Subsequent processing such as baking, curing, or other steps may be carried out (see, e.g., FIG. 2).

In addition, concern for the environment is leading to the development of benign processing steps and materials in order to reduce the presence of fluorocarbons and volatile organic compounds (VOC), both of which lead to poor indoor and environmental air quality. Further, environmental and human health concerns are pushing industry to adopt alternate technologies for the production of plastics and resins, coatings which are typically applied in dip-coat fashion to the exterior of packaging, air conditioning, automotive, and other surfaces.

There is often a desire for reduced weight, which favors high strength to weight materials such as aluminum for transportation and consumer device applications. Thinner, robust coatings that promote good adhesion and corrosion resistance are highly desirable. Further, conformal deposition and favorable resulting wetting properties are desirable for components with high aspect ratio or a design which includes features with small characteristic dimension.

Further, to reduce overall cost, it is desirable to have a simple and scalable process, such as is practiced in the surface treatment of automotive components. Lastly, a surface treatment process that may be carried out in batch or continuous processing steps at any scale is desirable.

The compositions and processes disclosed herein achieve the desirable properties noted above and are more fully described below.

BRIEF SUMMARY OF THE INVENTION

Nanostructured coating materials, methods for their production, and methods of use are provided herein.

In one aspect, a method is provided for depositing a nanostructured layer on a substrate. The method includes: (a) immeresing a substrate in an aqueous soution under conditions such tht a nanostructured layer is deposited on the substrate, thereby producing a coated susbstrate; (b) separating the substrate comprising the nanostructured layer from the solution; and (c) treating the coated substrate to stabilize the nanostructured layer and/or to prepare the nanostructured layer for subsequent processing. The nanostructured layer includes one or more $2^+$ and/or $3^+$ metal ion(s) from the aqueous solution and/or one or more metal(s) with $2^+$ and/or $3^+$ primary oxidation state from the substrate (e.g., one or more $2^+$ and/or $3^+$ metal ion(s) derived from metal(s) with $2^+$ and/or $3^+$ oxidation state in the substrate). Optionally, step (c) may include a thermal processing treatment. In some embodiments, the aqueous solution includes: (i) one or more $2^+$ and/or $3^+$ metal ion(s), and (ii) one or more buffering and/or reducing agent(s). In some embodiments, the substrate includes one or more metal(s) with $2^+$ and/or $3^+$ primary oxidation state. Optionally, a ternary phase that includes oxides of $2^+$ and/or $3^+$ metal ion(s) is formed in step (c). In some embodiments, the ternary phase includes one or more $2^+$ and/or $3^+$ metal ion(s) from the aqueous solution and one or more metal(s) with $2^+$ and/or $3^+$ primary oxidation state from the substrate (e.g., one or more $2^+$ and/or $3^+$ metal ion(s) derived from metal(s) with $2^+$ and/or $3^+$ oxidation state in the substrate). Optionally, the method may further include: (d) depositing one or more top coat(s) onto the nanostructured layer, thereby imparting or enhancing a desired property.

In some embodiments, the nanostructured material includes anionic and/or cationic components, and the method furthe includes one or more process step(s) to replace or exchange the anionic and/or cationic components. For eamxple, the anionic and/or cationic components may be replaced with inorganic or organic atoms, molecules, different anions and/or cations, complex biomolecules, or intercalated anionic and/or cationic components.

In one embodiment, the nanostructured layer includes a plurality of layered double hydroxide subunits, wherein each layered double hydroxide subunit includes a plurality of layers in which each layer includes a hydroxide of a $2^+$ metal and/or a hydroxide of a $3^+$ metal with one or more anion between the layers, wherein a number of the double hydroxide subunits are joined together to form a platelike structure, and wherein the nanostructured layer includes the platelike structures in an interspersed platelike morphology, and wherein the treatment in step (c) converts metal hydroxide to metal oxide (e.g., converts metal hydroxide to metal oxide and generates a ternary phase that includes $2^+$ and $3^+$ metal ions).

In some embodiments, the methods include application of an additional layer over the nanostructured layer, for example, paint layer, a catalytic layer, or an antimicrobial layer.

In another aspect, a substrate is provided that includes a nanosstructured coating layer as described herein. In some embodiments, the nanostructured coating layer includes one or more property selected from an adhesive property, optical property, a catalytic property, an antimicrobial property, a wetting property, an antifogging property, an antistatic property, enhances biomolecular adsorption, enhances the cathode and/or anode performance in an electrochemical cell, and an ability to enhance condensation or reduce adherence of frost.

In some embodiments, the substrate includes a top coat deposited onto the nanostructured layer, and the nanostructured coating layer increases the contact angle of the top coat material, enhances condensation properties of the top coat material, and/or enhances antifrosting properties of the top coat material in comparison to an identical substrate that does not include the nanostructured coating material.

In some embodiments, interaction with light in the presence of oxygen causes reaction or removal of organic materials from the surface of the nanostructured coating layer. In one embodiment, the light includes ultraviolet emission. For example, the light emission may have a component with energy levels greater than the optical or electronic bandgap of the nanostructured coating layer material.

In some embodiments, the nanostructured coating layer provides an increased surface area for deposition of one or more additional material in comparison with an identical substrate that does not include the nanostructured coating layer. In some embodiments, the substrate includes one or more additional material deposited onto the nanostructured coating layer, and the nanostructured coating layer enhances the performance of an electrochemical cell relative to an identical cell that does not include the nanostructured coating layer. For example, one or more additonal deposited onto the nanostructured coating layer may include a metallization, a cathode, an anode, andor an electrolyte. For example, the one or more additional material may include lithium, carbon, tin, or iron oxide, or a cathode material, such as aluminum, copper, cobalt, nickel, manganese, or related alloys.

In some embodiments, the substrate includes a hydrophobic material deposited onto the nanostructured coating layer, and the nanostructured coating enhances the performance of the hydrophobic material, for example, as measured by a reduction in viscous drag, relative to an identical substrate that includes the hydrophobic material but does not include nanostructured coating layer.

In some embodiments, the substrate includes an adhesive layer. In some embodiments, a sticker may be affixed to the surface to provide improved properties provided by the nanostructured coating layer, relative to an identical substrate that does not include the nanostructured coating layer.

In other aspects, methods of use are provided for substrates that are coated with a nanostructured layer as described herein. In one embodiment, a method is provided that includes applying a coating of a second useful or functional material over the nanostructured layer, wherein the nanostructured layer comprises an adhesive property that enhances adherence of the second material in comparison to an identical substrate that does not comprise the nanostructured layer. In another embodiment, a method is provided that includes applying a coating of a second useful or functional material over the nanostructured layer, wherein the nanostructured layer increases an adhesive property of the second material, thereby enhancing adherence of the second material in comparison to a substrate which comprises a non-nanostructured layer instead of the nanostructured layer. The second material may be, for example, a paint composition, and the non-nanostructured layer may be, for example, a primer composition. In another embodiment, substrates that are coated with a nanostructured layer as described herein are used without additional processing, for example, as a wicking surface which functions due to the high wettability or as a microelectronic getter owing to the high surface area.

In one embodiment, a method is provided for removing adhered and/or adsorbed materials from a substrate that includes a nanostructued coating layer as described herein, including directing light to the substrate for a period of time sufficient to remove the adhered and/or adsorbed materials. In some embodiments, iinteraction with light in the presence of oxygen causes reaction or removal of organic materials (e.g., adhered and/or adsorbed materials organic materials) from the surface of the nanostructured coating layer. For example, the light may include ultraviolet emission. For example, the light emission may have a component with energy levels greater than the optical or electronic bandgap of the nanostructured coating layer material.

In some embodiments, the nanostructured material has desirable optical properties and a method is provided for use of the nanostructure coated substrate in an optical application.

In some embodiments, a second material that imparts catalytic or antimicrobial properties is deposited over the nanostructured layer, wherein the nanostructure composition enhances the catalytic or antimicrobial properties of the second material in comparison with a substrate that does not contain the nanostructured layer or that contains a non-nanostructured layer.

In some embodiments, a second material that imparts anti-fogging and/or wicking/hydrophilic properties is deposited over the nanostructured layer, wherein the nanostructure composition enhances the anti-fogging and/or wicking/hydrophilic properties of the second material in comparison with a substrate that does not contain the nanostructured layer or that contains a non-nanostructured layer. One non-limiting example of an anti-fogging material is a polyethylene glycol based silane.

In some embodiments, a second material that acts as a cathode and/or anode for electrochemical reactions is deposited over the nanostructured layer, wherein the nanostructure composition enhances the performance of the cathode and/or anode material relative to a substrate that does not contain the nanostructured layer or that contains a non-nanostructured layer.

In some embodiments, a second material that orients liquid crystals and/or imparts anti-static properties is deposited over the nanostructured layer, wherein the nanostructure composition enhances the anti-static properties of the second material in comparison with a substrate that does not contain the nanostructured layer or that contains a non-nanostructured layer.

In other embodiments, a second material that imparts a desired level of control of biomolecule adsorption is deposited over the nanostructured layer, wherein the nanostructure composition enhances the control of biomolecule adsorption of the second material in comparison with a substrate that does not contain the nanostructured layer or that contains a non-nanostructured layer.

BRIEF DESCRIPTION OF THE DRAWINGS

FIG. 4A, FIG. 4B, FIG. 4C, FIG. 4D, FIG. 4E.

FIG. 5A, FIG. 5B.

DETAILED DESCRIPTION

Nanostructured coating materials are provided herein, as well as methods for their production and use in a variety of applications. The nanostructured coating materials herein include one or more $2^+$ and/or $3^+$ metal ion(s).

Figure 1:
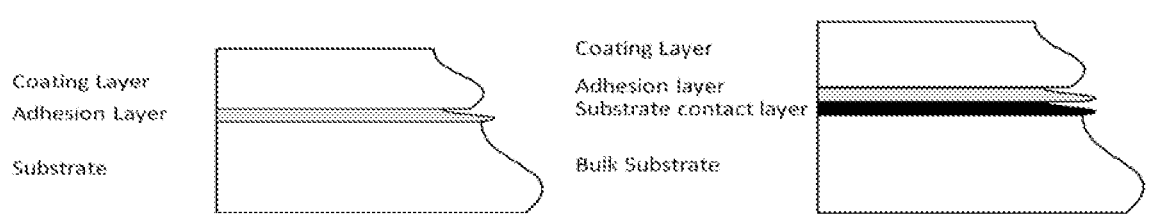
FIG. 1 shows a typical system with an adhesion layer between a coating layer and a substrate (left) and a system in which an intermediate substrate contact layer (i.e., a nanostructure coating layer) is between the adhesion layer and the substrate (right) in one embodiment as disclosed herein.
Figure 2:
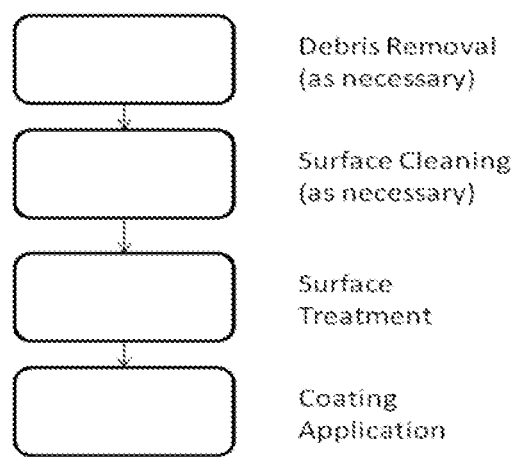
FIG. 2 shows an embodiment of a workflow for a method for depositing a nanostructured layer on a substrate as described herein.

Nanostructured coatings are described, which when used as an intermediate layer between a substrate and another coating material, provide additional benefits to the end user (FIG. 1). Desirable properties of the materials described herein may include, but are not limited to, increased water-repellency ("hydrophobicity"), increased top-coat adhesion, lighter weight, increased durability, increased corrosion resistance, increased catalytic activity, modified optical properties, and ability to modify and/or alternate top-coat identity, composition, thickness, and application method.

A process designed to provide improved properties of paints and other desired coatings to a substrate layer through a surface treatment is described herein.

"A," "an" and "the" include plural references unless the context clearly dictates otherwise.

A "nanostructured" composition refers herein to a composition that has a feature in at least one dimension that is less than 100 nanometers.

A "capping agent" refers to a compound or agent that slows crystal growth and permits modulation of the morphology of the nanosurface.

"Platelike" structure refers to a 2-dimensional structure that is significantly larger in two dimensions than the third dimension.

"Interspersed platelike morphology" refers to an arrangement of a platelike structures wherein the plates overlap to provide a three dimensional structure.

"Ternary phase" refers to a compound that contains three elements.

"Intercalated" anionic or cationic replacement refers to the reversible inclusion or replacement of ions between platelike structural layers. For example, a nitrate anion intercalated between layers of a zinc-aluminum layered double hydroxide can be replaced with another anion such as sulfate or a cation such as sodium.

Methods for Depositing a Nanostructured Layer

Methods are provided herein for depositing a nanostructured layer on a substrate. The methods include: (a) immersing a substrate that includes one or more metal(s) with $2^+$ and/or $3^+$ primary oxidation state in an aqueous solution that comprises one or more $2^+$ and/or $3^+$ metal ion(s), and a buffering agent and/or a reducing agent, under conditions such that a nanostructured layer is deposited on the substrate; (b) separating the substrate comprising the nanostructured layer from the solution; and (c) treating the coated substrate to stabilize the nanostructured layer and/or to prepare the nanostructured layer for subsequent processing. The metal ion(s) of the substrate may be the same or different from the metal ion(s) in the aqueous solution. In some embodiments, a precipitate may form in the aqueous solution that is an oxide of the metal ion(s) in the solution. Optionally, prior to step (a), the substrate may be pretreated with one or more treatments, such as cleaning, degreasing, rinsing, etching, desmutting, oxidizing, removing previous treatments, roughening, planarizing, and/or smoothing.

The conditions in step (a) may be any suitable conditions that result in deposition of a desired nanostructured layer onto a substrate. In some embodiments, the conditions in (a) include $2^+$ and/or $3^+$ metal ion concentration, e.g., $2^+$ and/or $3^+$ metal ion concentration in the aqueous solution, of about 5 mM to about 100 mM or about 250 mM, pH about 5 or about 6 to about 8 or about 9, and temperature about 20° C. to about 120° C. for about 5 min to about 240 min.

The nanostructured layer may be deposited at any thickness for a desired application of use. In some embodiments, the nanostructured layer is about 0.05 or about 0.1 µm to about 10 µm in thickness.

The substrate may include one or more metal(s) with $3^+$ primary oxidation state (for example, but not limited to, $Al^{3+}$, $Fe^{3+}$, $Cr^{3+}$, $Mn^{3+}$, $Ni^{3+}$, $Co^{3+}$, $Si^{3+}$, $Ti^{3+}$, and/or $Ga^{3+}$, and/or one or more metal(s) with $2^+$ primary oxidation state, for example, but not limited to, $Zn^{2+}$, $Mn^{2+}$, $Mg^{2+}$, $Ni^{2+}$, $Mo^{2+}$, and/or $Cd^{2+}$. In one embodiment, the substrate includes $Al^{3+}$. In some embodiments, the substrate is an alloy that includes one or more metal(s) with $3^+$ primary oxidation state and/or one or more metal(s) with $2^+$ primary oxidation state. For example, the substrate may be an aluminum alloy, nickel alloy, stainless steel, semiconductor substrate, glass or other amorphous solid, or crystalline ceramic.

In some embodiments, the $2^+$ and/or $3^+$ metal ion(s) in the aqueous solution is/are derived from metal salt(s) that are dissolved in water to form the aqueous solution. For example, the metal salt(s) may be dissolved in the aqueous solution at a concentration of about 5 mM to about 200 mM, or about 200 mM to about 1M. In some embodiments, the metal salt may include a nitrate, phosphate, sulfate or acetate salt of the $2^+$ and/or $3^+$ metal. In some embodiments, the aqueous solution includes a blend of $2^+$ and $3^+$ metal salts. In one embodiment, the aqueous solution includes $Zn^{2+}$ derived from $Zn(NO_3)_2$. In one embodiment, the aqueous solution includes $Zn^{2+}$ derived from $Zn(NO_3)_2$ and the substrate includes $Al^{3+}$.

In various embodiments, the aqueous solution includes one or more of a buffering agent, a reducing agent, a catalyst, and a surfactant. The buffering and/or reducing agent in the aqueous solution may be any agent(s) that are suitable to maintain the pH in a desired range and/or to provide suitable redox conditions during deposition of the nanostructured layer on the substrate. In some embodiments, the aqueous solution may include one or more of urea, hexamethylenetetramine (HMTA), sodium alginate, ammonia, and/or persulfate. In some embodiments, the solution may contain a compound serving as a capping agent or surfactant. In some embodiments, a single compound or agent may serve more than one of these functions in the aqueous solution. In one nonlimiting embodiment, HMTA may act as a reducing agent and a capping agent in the aqueous solution.

In some embodiments, step (a) includes application of an external voltage bias, e.g., to promote electrophoresis or electroplating of the substrate.

In some embodiments, step (a) includes agitation. Agitation may serve, for example, to maintain uniformity of metal ion concentrations in the aqueous solution, dislodge gas bubbles (e.g., reaction gas and/or non-condensed gas bubbles, such as air and/or $CO_2$), and/or facilitate metal transfer to the surface of the substrate. Agitation may include, but is not limited to, ultrasonic agitation, mechanical agitation, agitation via recirculation by natural or forced convection, or agitation via movement of exogenously added gas or movement of gas that is naturally formed during step (a).

In some embodiments, step (c) includes thermal processing to a temperature below the solidus temperature of the substrate and greater than about 100° C. or about 200° C. Thermal processing may include, for example, heating the coated substrate to a temperature of about 100° C. or about 300° C. to about 600° C. for about 0.1 hour to about 48 hours.

In other embodiments, step (c) includes oxidation, aqueous oxidation, or reduction, thereby facilitating carbonaceous residue removal; water removal; or condensation of metal hydroxide layers, thereby removing interlayer anion that is between hydroxide layers; and/or dehydration of deposited hydroxides in oxides.

In some embodiments, step (c) may include one or more processing steps to replace anionic and/or cationic components. For example, anion exchange may be used to provide improved processing conditions or performance.

In some embodiments, the nanostructured layer includes $2^+$ metal ions. In other embodiments, the nanostructured layer includes $3^+$ metal ions. In further embodiments, the nanostructured layer includes both $2^+$ and $3^+$ metal ions, for example, in a ternary phase.

In some embodiments, the nanostructured layer produced with the methods described herein may include a plurality of layered double hydroxide subunits, wherein each layered double hydroxide subunit includes a plurality of layers in which each layer includes a hydroxide of a $2^+$ metal and/or a hydroxide of a $3^+$ metal with one or more anion between the layers, wherein a number of the double hydroxide subunits are joined together to form a platelike structure, and wherein the nanostructured layer includes the platelike structures in an interspersed platelike morphology, and wherein the treatment in step (c) generates a phase of $2^+$ and/or $3^+$ metal ions and converts metal hydroxide to metal oxide.

For example, the deposited material may include multiple layered double hydroxide subunits, e.g., layers that each contain a metal hydroxide prepared from a $3^+$ metal ion (for example, but not limited to, a $3^+$ metal from the substrate), and/or a metal hydroxide prepared from a $2^+$ metal ion (for example, but not limited to, a $2^+$ metal in an aqueous solution that includes one or more buffering and/or reducing agent(s), in which the substrate is immersed), with double layers of hydroxides of the metal ion(s) sandwiching, i.e., including therebetween an anionic layer (e.g., nitrate, carbonate, sulfate, phosphate, sulfate, acetate, formate, and/or chlorate ions) to form a "layered double hydroxide."

The deposited material includes a plurality of layered double hydroxide subunits. Each layered double hydroxide subunit includes a plurality of layers, e.g., two or more layers, each of which layers includes a hydroxide of a $2^+$ metal and/or a hydroxide of a $3^+$ metal with one or more anion(s) between layers of the double hydroxide subunit, and a number of the layered double hydroxide subunits join or stack together to form a platelike structure, for example, by electrostatic interaction. The deposited nanostructured layer includes a number of the platelike structures in an interspersed platelike morphology.

In various embodiments, a hydroxide layer of a layered double hydroxide may include a hydroxide of a $2^+$ metal, a hydroxide of a $3^+$ metal, or a mixture of hydroxides of a $2^+$ metal and a $3^+$ metal. In some embodiments, a layer of a layered double hydroxide subunit includes a hydroxide of a $2^+$ metal or a hydroxide of a $3^+$ metal. In some embodiments, a layer of a layered double hydroxide subunit includes a mixture of a hydroxide of a $2^+$ metal and a hydroxide of a $3^+$ metal. In some embodiments, a layer of a layered double hydroxide subunit includes a hydroxide of a $2^+$ metal, a hydroxide of a $3^+$ metal, or a mixture of hydroxides of a $2^+$ metal and a $3^+$ metal.

Layered double hydroxides may include layers that include the same metal ion(s) (e.g., all layers include the same $2^+$ and/or $3^+$ ion(s)), or may include layers that include different metal ion(s) (e.g., different layers include different metal ion(s)). In some embodiments, the $2^+$ metal and the $3^+$ metal may be cations of the same metal, for example, but not limited to, Mn, which may be deposited in the $2^+$ state and the $3^+$ state simultaneously. As used herein, "a" $2^+$ metal or "a" $3^+$ metal may refer to one or more $2^+$ or $3^+$ metal(s), respectively.

Substrate

The substrate on which the nanostructured coating material is deposited may is composed of a material that that is suitable to withstand the processing conditions for producing a nanostructured coating composition, e.g., a nanostructured ternary phase, as described herein, for example, capable of withstanding the temperature used for the processing steps as described herein. In some embodiments, the substrate may include one or more metal(s) with $2^+$ and/or $3^+$ primary oxidation state. In one embodiment, the substrate includes one or more metal(s) with $3^+$ primary oxidation state. In some embodiments, the $3^+$ metal(s) include(s) $Al^{3+}$, $Fe^{3+}$, $Cr^{3+}$, $Mn^{3+}$, $Ni^{3+}$, $Co^{3+}$, $Si^{3+}$, $Ti^{3+}$, and/or $Ga^{3+}$. In one embodiment, the substrate comprises, consists, or consists essentially of aluminum. In one embodiment, the substrate is an aluminum alloy with differing amounts of alloying elements, for example, including one or more of Si, Fe, Cu, Mn, Mg, Cr, Zn, V, Ti, Bi, Ga, Pb, and/or Zr.

In some embodiments, the substrate may include one or more metal(s) with $2^+$ primary oxidation state. In some embodiments, the $2^+$ metal(s) include(s) $Zn^{2+}$, $Mn^{2+}$, $Ni^{2+}$, $Mo^{2+}$, $Fe^{2+}$, and/or $Cd^{2+}$. In some embodiments, the substrate may include metal(s) with both $2^+$ and $3^+$ primary oxidation states, for example, $Al^{3+}$, $Fe^{3+}$, $Cr^{3+}$, $Mn^{3+}$, $Ni^{3+}$, $Co^{3+}$, $Si^{3+}$, $Ti^{3+}$, and/or $Ga^{3+}$, and/or $Zn^{2+}$, $Mn^{2+}$, $Ni^{2+}$, $Mo^{2+}$, $Fe^{2+}$, and/or $Cd^{2+}$.

In some embodiments, the substrate may be an alloy of one or more metal(s) with $2^+$ primary oxidation state, such as $Al^{3+}$, $Fe^{3+}$, $Cr^{3+}$, $Mn^{3+}$, $Ni^{3+}$, $Co^{3+}$, $Si^{3+}$, $Ti^{3+}$, and/or $Ga^{30}$. In some embodiments, the substrate may be an alloy of one or more metal(s) with $2^+$ primary oxidation state, such as $Zn^{2+}$, $Mn^{2+}$, $Ni^{2+}$, $Mo^{2+}$, $Fe^{2+}$, and/or $Cd^{2+}$. In some embodiments, the substrate may be an alloy of both one or more metal(s) with $3^+$ primary oxidation state and one or more metal(s) with $2^+$ primary oxidation state, for example, $Al^{3+}$, $Fe^{3+}$, $Cr^{3+}$, $Mn^{3+}$, $Ni^{3+}$, $Co^{3+}$, $Si^{3+}$, $Ti^{3+}$, and/or $Ga^{3+}$, and $Zn^{2+}$, $Mn^{2+}$, $Ni^{2+}$, $mo^{2+}$, $Fe^{2+}$, and/or $Cd^{2+}$. In some embodiments, the substrate may include the metal(s) with $2^+$ and/or $3^+$ primary oxidation state) in a stainless steel alloy, nickel alloy, metal-containing amorphous (e.g., soda lime glass), semiconductor materials (e.g., silicon, silicon dioxide, silicon carbide, aluminum nitride, gallium nitride) or crystalline (e.g., quartz, sapphire) ceramics. In some embodiments, the substrate does not contain metal(s) with $3^+$ or $2^+$ primary oxidation state. For example, the substrate may be composed of or include glass or ceramic material that does not contain metal(s) with $2^+$ and/or $3^+$ primary oxidation state. For example, the substrate may be a glass or ceramic material with a +4 oxidation state.

In some embodiments, the substrate is pretreated prior to deposition of a nanostructure coating layer as described herein, to remove debris or substance(s) on the surface and/or to smooth the surface (i.e., to access the substrate to promote adhesion and to prevent defects), with one or more treatment(s) selected from cleaning, degreasing, rinsing, etching, desmutting, oxidizing, removing previous treatments, roughening, planarizing, steam cleaning, thermal oxidation, and smoothing.

Aqueous Solution

The substrate is immersed in an aqueous solution. The aqueous solution includes $2^+$ and/or $3^+$ metal ion(s) that are provided in the solution, $2^+$ and/or $3^+$ metal ion(s) that are derived from the substrate, or both. In some embodiments, the aqueous solution in which the substrate is immersed includes one or more $2^+$ and/or $3^+$ metal ion(s). In other embodiments, the aqueous solution does not include $2^+$ and/or $3^+$ metal ion(s), and metal(s) of the substrate with $2^+$ and/or $3^+$ oxidation state are dissolved in the aqueous solution after the substrate is immersed therein to provide $2^+$ and/or $3^+$ metal ion(s) in the aqueous solution. In other embodiments, the the aqueous solution in which the substrate is immersed includes one or more $2^+$ and/or $3^+$ metal ion(s) and metal(s) of the substrate with $2^+$ and/or $3^+$ oxidation state are dissolved in the aqueous solution after the substrate is immersed therein to provide additional $2^+$ and/or $3^+$ metal ion(s) in the aqueous solution.

In some embodiments, the aqueous solution includes one or more $2^+$ metal ion(s), for example, $Zn^{2+}$, $Mn^{2+}$, $Mg^{2+}$, $Ni^{2+}$, $Mo^{2+}$, $Fe^{2+}$, and/or $Cd^{2+}$. In one embodiment, the $2^+$ metal ion comprises, consists of, or consists essentially of $Zn^{2+}$. In some embodiments, the aqueous solution includes one or more 3+ metal ion(s), for example, $Al^{3+}$, $Fe^{3+}$, $Cr^{3+}$, $Mn^{3+}$, $Ni^{3+}$, $Co^{3+}$, $Si^{3+}$, $Ti^{3+}$, and/or $Ga^{3+}$. In some embodiments, the aqueous solution includes one or more $2^+$ metal ion(s) and one or more $3^+$ metal ion(s), for example, $Al^{3+}$, $Fe^{3+}$, $Cr^{3+}$, $Mn^{3+}$, $Ni^{3+}$, $Co^{3+}$, $Si^{3+}$, $Ti^{3+}$, and/or $Ga^{3+}$, and/or $Zn^{2+}$, $Mn^{2+}$, $Mg^{2+}$, $Ni^{2+}$, $Mo^{2+}$, $Fe^{2+}$, and/or $Cd^{2+}$.

In some embodiments, the $2^+$and/or $3^+$metal ion is derived from one or more metal salt that is dissolved in water to form the aqueous solution. For example, the metal salt may be dissolved in the aqueous solution at a concentration of about 5 mM to about 200 mM, or about 200 mM to about 1M. In some embodiments, the metal salt concentration is about 5 mM to about 25 mM, about 25 mM to about 50 mM, about 50 mM to about 75 mM, about 75 mM to about 100 mM, about 100 mM to about 125 mM, about 125 mM to about 150 mM, about 150 mM to about 175 mM, about 175 mM to about 200 mM, about 10 mM to about 40 mM, about 15 mM to about 50 mM, about 20 mM to about 40 mM, about 40 mM to about 80 mM, about 50 mM to about 100 mM, about 100 mM to about 175 mM, about 100 mM to about 200 mM, about 200 mM to about 400 mM, about 400 mM to about 600 mM, about 600 mM to about 800 mM, about 800 mM to about 1M, about 200 mM to about 500 mM, about 500 mM to about 750 mM, about 700 mM to about 1 M, or about 500 mM to about 1M, or any of about 5 mM, 10 mM, 15 mM, 20 mM, 25 mM, 30 mM, 35 mM, 40 mM, 45 mM, 50 mM, 55 mM, 60 mM, 65 mM, 70 mM, 75 mM, 80 mM, 85 mM, 90 mM, 95 mM, 100 mM, 105 mM, 110 mM, 115 mM, 120 mM, 125 mM, 130 mM, 135 mM, 140 mM, 145 mM, 150 mM, 155 mM, 160 mM, 165 mM, 170 mM, 175 mM, 180 mM, 185 mM, 190 mM, 195 mM, 200 mM, 250 mM, 300 mM, 350 mM, 400 mM, 450 mM, 500 mM, 550 mM, 600 mM 650 mM, 700 mM, 750 mM, 800 mM, 850 mM, 900 mM, 950 mM, or 1M.

In some embodiments, one or more $2^+$ and/or $3^+$ metal ion(s) is/are derived from the substrate and the aqueous solution also contains one or more $2^+$ and/or $3^+$ metal ion(s), which may be the same or different as the $2^+$ and/or $3^+$ metal ion(s) from the substrate. In some embodiments, the aqueous solution includes one or more $2^+$ and/or or $3^+$ metal ion(s) dissolved in the solution from the substrate, for example, $Zn^{2+}$, $Mn^{2+}$, $Ni^{2+}$, $Mo^{2+}$, $Fe^{2+}$, and/or $Cd^{2+}$, and/or $Al^{3+}$, $Fe^{3+}$, $Cr^{3+}$, $Mn^{3+}$, $Ni^{3+}$, $Co^{3+}$, $Si^{3+}$, $Ti^{3+}$, and/or $Ga^{3+}$, and the aqueous solution includes one or more $2^+$ and/or or $3^+$ metal ion(s) prior to immersion of the substrate in the solution, for example, $Zn^{2+}$, $Mn^{2+}$, $Mg^{2+}$, $Ni^{2+}$, $Mo^{2+}$, $Fe^{2+}$, and/or $Cd^{2+}$, and/or $Al^{3+}$, $Fe^{3+}$, $Cr^{3+}$, $Mn^{3+}$, $Ni^{3+}$, $Co^{3+}$, $Si^{3+}$, $Ti^{3+}$, and/or $Ga^{3+}$, which metal ions from the substrate and metal ions in the solution prior to immersion of the substrate may be the same or different.

In some embodiments, one or more $2^+$ and one or more $3^+$ metal ion(s) are derived from one or more substrate(s) and the aqueous solution contains no metal ion(s). In some embodiments, the aqueous solution includes no metal ion(s) and $2^+$ and $3^+$ metal ion(s), for example, $Zn^{2+}$, $Mn^{2+}$, $Mg^{2+}$, $Ni^{2+}$, $Mo^{2+}$, $Fe^{2+}$, and/or $Cd^{2+}$, and $Al^{3+}$, $Fe^{3+}$, $Cr^{3+}$, $Mn^{3+}$, $Ni^{3+}$, $Co^{3+}$, $Si^{3+}$, $Ti^{3+}$, and/or $Ga^{3+}$, are dissolved in the solution after immersion of the substrate.

In certain non-limiting embodiments, the metal salt may be a nitrate, phosphate, sulfate, chloride, formate, citrate, or acetate salt of the $2^+$ and/or $3^+$ metal. In one embodiment, the $2^+$ metal ion is $Zn^{2+}$ derived from $Zn(NO_3)_2$. In one embodiment, the $2^+$ metal ion is $Zn^{2+}$, for example, derived from $Zn(NO_3)_2$, for example, at about 20 mM to about 40 mM, for example, 25 mM.

The aqueous solution also contains one or more buffering agent(s), reducing agent(s), catalyst(s), and surfactant(s). The buffering and/or reducing agent(s) may be chosen to keep the aqueous solution at a desired pH and/or to provide desirable redox conditions during the nanostructure coating deposition process. In one embodiment, the buffering and/or reducing agent(s) maintain the pH close to neutral pH. In an embodiment, the buffering and/or reducing agent(s) maintain the pH at about 6 to about 8. In one embodiment, the $2^+$ metal ion is $Zn^{2+}$ maintained at a pH of about 6 to about 8. Other pH levels may be desirable for other metal ions, and the buffering and/or reducing agent(s) may be chosen accordingly. In some embodiments, the pH is about 2 to about 12, or about 4 to about 10, or about 6 to about 8. In some embodiments, the buffering and/or reducing agent includes one or more tertiary amine(s), for example, hexamethylenetetramine. In some embodiments, the buffering and/or reducing agent includes hexamethylenetetramine and/or urea. In some embodiments, the buffering and/or reducing agent includes urea. In some embodiments the buffering and/or reducing agent includes ammonia. In some embodiments, reducing agent(s) include ammonia, urea, HMTA, and/or a base (e.g., dilute base) such as sodium hydroxide). In some embodiments the buffering and/or reducing agent includes ethylenediaminetetraacetic acid (EDTA). In some embodiments, buffering and reducing agents may be provided as separate compounds.

In some embodiments, a metal chelating agent, e.g., citric acid, may be added.

In some embodiments, the aqueous solution includes one or more catalyst(s), e.g., a radical forming compound, e.g., a persulfate (for example, potassium persulfate) or peroxide (e.g., hydrogen peroxide).

In some embodiments, the aqueous solution may contain one or more compound serving as a capping agent or surfactant. Nonlimiting examples of surfactants (e.g., compounds with polar and nonpolar functional groups) that may be included in the aqueous solution include sodium dodecyl sulfate (SDS) and derivatives thereof and sodium alginate. In some embodiments, sodium alginate is included in the aqueous solution as a surfactant and/or capping agent.

In some embodiments, a precipitate forms in the aqueous solution. The precipitate may be separated from the aqueous solution and may be used as a component of a spray, rolled, or dipped coating. The precipitate may be recovered and reacted to be returned to the process as a primary reagent. Recycling of process effluents throughout the process is acceptable and encouraged to minimize waste.

Compositions

Compositions that include nanostructured coating layers as described herein are provided. In some embodiments, a substrate is provided that includes a nanostructured coating layer, prepared by any of the methods described herein.

In some embodiments, a nanostructured coating composition is provided that includes a ternary phase of $2^+$ and $3^+$ metal oxides. In one embodiment, the ternary phase includes oxides of $Zn^{2+}$ and $Al^{3+}$. In other embodiments, a nanostructured coating composition that includes one or more $2^+$ metal oxide but does not include $3^+$ metal oxides is provided. In further embodiments, a nanostructured coating composition that includes one or more $3^+$ metal oxide but does not include $2^+$ metal oxides is provided.

For example, the $3^+$ metal oxide may include, but is not limited to, oxide(s) of $Al^{3+}$, $Fe^{3+}$, $Cr^{3+}$, $Mn^{3+}$, $Ni^{3+}$, $Co^{3+}$, $Si^{3+}$, $Ti^{3+}$, and/or $Ga^{3+}$. For example, the $2^+$ metal oxide may include, but is not limited to, $Zn^{2+}$, $Mn^{2+}$, $Ni^{2+}$, $Mo^{2+}$, and/or $Cd^{2+}$.

In some embodiments, a processing step may include replacement the anionic and cationic components with more desirable units, structures, or molecular functionalities, including but not limited to intercalated anionic replacement with organic, inorganic or complex biomolecules, or intercalated cationic replacement.

In some embodiments, a nanostructured coating composition as described herein, for example, a nanostructured metal oxide coating composition that includes a ternary phase of $2^+$ and $3^+$ metal oxides, includes desirable optical properties. For example, the nanostructured composition may interact with light in a photocatalytic manner. In some embodiments, a coating for optical applications is provided that includes a nanostructured metal oxide as described herein. In some embodiments, a coating for tuning of spectral emissivity is provided that includes a nanostructured metal oxide as described herein.

In some embodiments, an evaporator or heat exchanger is provided that includes a coating of a nanostructured composition as described herein, for example, a nanostructured metal oxide coating composition that includes a ternary phase of $2^+$ and $3^+$ metal oxides. In some embodiments, the net flux (e.g., air side capacity of the heat exchanger) is increased for a given operating temperature in comparison to an evaporator or heat exchanger that does not comprise the nanostructured coating composition.

In some embodiments, a hydrophobic coating for packaging, e.g., aluminum packaging, is provided, that includes a nanostructured composition as described herein, for example, a nanostructured metal oxide coating composition that includes a ternary phase of $2^+$ and $3^+$ metal oxides. The nanostructured metal oxide is thin and does not materially affect the mechanical properties of the underlying foil substrate.

In some embodiments, a coating is provided for depositing and/or adhering enzyme(s) and/or antimicrobial agent(s), that includes a nanostructured coating composition as described herein, for example, a nanostructured metal oxide coating composition that includes a ternary phase of $2^+$ and $3^+$ metal oxides. In some examples, the nanostructured coating may increase the activity of an enzyme deposited and/or adhered thereto, in comparison with the activity of the enzyme that is not deposited on or adhered to the coating.

In some embodiments, interaction between a microorganism and the nanostructured coating is modified relative to a substrate that does not comprise a nanostructured coating. For example, adjacent to the nanostructured coating, the cell may exhibit increased or decreased transcellular flux of harmful or useful compounds. For example, the microorganism adjacent to the nanostructured coating may exhibit altered physiology due to increased or decreased adhesion to the substrate. For example, the microorganism adjacent to the nanostructured coating may exhibit altered morphology due to interaction with the surface.

In some embodiments, a coating is deposited onto a surface that includes a nanostructured coating composition and a top coat. For example, the top coat may include a paint, a paint binder, hydrophobic material, a hydrophilic material, a metal or metal-containing compound, or an antimicrobial agent.

In some embodiments, a top coat is a surface modifying top coating which reduces the viscous drag of an external or internal fluid on the surface. In some embodiments, a coating is deposited onto a surface that includes a nanostructured coating composition and a surface modifying top coating which reduces the viscous drag of an external or internal fluid on the surface and further includes additional benefits such as corrosion resistance, fouling resistance, self cleaning, heat transfer characteristics, optical characteristics, chemical inertness, other useful properties or combinations of properties.

In some embodiments, a top coat is or contains an antimicrobial agent. For example, an antimicrobial agent may be a charge transfer compound or agent that disrupts movement of ions across a cell membrane, for example, a quarternary amine. In some embodiments, the antimicrobial agent is a beta-lactam, an aminoglycoside, a tetracycline, a chloramphenicol, a macrolide, a lincosamide, a sulfonamide, a quinolone, a polyene, an azole, or a griseofulvin.

In some embodiments, a top coat is or contains a paint binder. For example, the paint binder may be an alkyd, an acrylic, a vinyl-acrylic, a vinyl acetate/ethylene (VAE), a polyurethane, a polyester, a melamine resin, an epoxy, a silane, or an oil.

In some embodiments, a substrate is provided that includes a nanostructured coating composition as described herein deposited thereon, for example, a nanostructured metal oxide coating composition that includes a ternary phase of $2^+$ and $3^+$ metal oxides, or a nanostructured coating that includes $2^+$ metal oxides only or $3^+$ metal oxides only. In some embodiments, the nanostructured coating composition on the substrate is about 0.1 μm to about 10 μm in thickness. The substrate may include metal(s) with $2^+$ and/or $3^+$ primary oxidation state, e.g., providing the $2^+$ and/or $3^+$ metal ion(s) of the nanostructured composition. In one embodiment, the substrate includes $Al^{3+}$. In some embodiments, the substrate is an alloy that includes metal(s) with $2^+$ and/or $3^+$ primary oxidation state. In one embodiment, the substrate is an optical glass alloy.

A substrate with a nanostructured coating composition as described herein deposited thereon, for example, a nanostructured metal oxide coating composition that includes a ternary phase of $2^+$ and $3^+$ metal oxides, or a nanostructured coating that includes $2^+$ metal oxides only or $3^+$ metal oxides only, may further include a coating of a second material over the nanostructured layer, wherein the nanostructured layer increases an adhesive property of the second material, thereby enhancing adherence of the second material in comparison to a substrate which includes a non-nanostructured layer instead of the nanostructured layer.

In some embodiments, a substrate with a nanostructured coating composition as described herein deposited thereon, for example, a nanostructured metal oxide coating composition that includes a ternary phase of $2^+$ and $3^+$ metal oxides, or a nanostructured coating that includes $2^+$ metal oxides only or $3^+$ metal oxides only, may further include a layer that includes a catalyst or catalytic properties over the nanostructured layer to promote catalytic activity on the surface.

In some embodiments, a substrate with a nanostructured coating composition as described herein deposited thereon, for example, a nanostructured metal oxide coating composition that includes a ternary phase of $2^+$ and $3^+$ metal oxides, or a nanostructured coating that includes $2^+$ metal oxides only or $3^+$ metal oxides only, may further include a layer that includes an antimicrobial substance or antimicrobial properties over the nanostructured layer.

In some embodiments, a nanostructured coating composition as described may be used for lithography, patterning, protecting, or as a structural layer for microelectronic devices.

In some embodiments, a conversion coating is provided that is derived from a nanostructured coating composition as described herein.

In some embodiments, a metal oxide precipitate composition is provided, prepared by separating the metal oxide from an aqueous solution that includes one or more $2^+$ and/or $3^+$ metal ion(s) and a buffering agent and/or a reducing agent and that is used to prepare a nanostructured coating composition as described herein, wherein the precipitate forms in the aqueous solution as an oxide of one or more metal ion(s) in the solution. In one embodiment, a sunscreen formulation is provided that includes the metal oxide precipitate.

Applications of Use

Nanostructured coating compositions as described herein may be deployed in numerous applications of use, including, but not limited to, adhesion of additional materials, optical applications, antimicrobial applications, enhanced microbial applications, catalytic applications, reduction of frost, enhanced condensation performance, reduction of drag, self-cleaning, fouling minimization, sanitation, packaging, wicking (of water or cooling agent or for bearing applications—wicking of oil), cookware (e.g., as a pan bottom water and oil would evenly distribute, imparting good thermal uniformity to a thin substrate), drying and evaporation, passive cooling for buildings, water collection, as a marking material (e.g., drawing with pen or as a laser target, having a particular optical signature), a material for aesthetic purposes (e.g., architectural material with aesthetically pleasing characteristics), antifogging, cathode/anode enhancement in electrochemical cells, liquid crystal orientation, antistatic, and biomolecular adsorption.

In some embodiments, a nanostructured layer is deposited on a substrate, as described herein, and a coating of a second material (e.g., a useful or functional material) is deposited over the nanostructured layer, wherein the nanostructured layer includes an adhesive property that enhances adherence of the second material in comparison to an identical substrate that does not include the nanostructured layer. In one embodiment, the second material is a paint composition.

In some embodiments, a nanostructured layer is deposited on a substrate, as described herein, and a coating of a second material is deposited over the nanostructured layer, wherein the nanostructured layer increases an adhesive property of the second material, thereby enhancing adherence of the second material in comparison to a substrate that includes a non-nanostructured layer instead of the nanostructured layer. In one embodiment, the nanostructured layer is lighter weight than the non-nanostructured layer. In one embodiment, the second material is a paint composition and the non-nanostructured layer is a primer.

In some embodiments, a nanostructured layer as described herein promotes adhesion of a second material (e.g., a paint composition) in such a way that a thinner layer of second material may be applied, resulting in a lighter weight application of the second material than a comparable system that employs a non-nanostructured layer instead of the nanostructured layer.

In some embodiments, the condensation performance of a composite nanostructured material and a second material deposited thereon per unit area is enhanced in comparison to a composite of the same material deposited on a non-nanostructured layer. The condensation performance may be determined, for example, by nominal average size of condensate droplets, ability of the composite material to continually achieve condensation performance (e.g., for periods of time greater than 12 hours, 24 hours, or longer), and/or ability to remove condensate droplets from the surface through, e.g., via increased air flow, vibration, natural droplet ejection, and/or acoustic, electrostatic, or alternative forcing mechanism.

In some embodiments, a nanostructured layer as described herein provides a barrier to both electronic and ionic flow so as to reduce corrosion rates of the underlying substrate.

In some embodiments, a nanostructured layer is deposited on a substrate, as described herein, and a coating of a second material is deposited over the nanostructured layer, wherein the nanostructured layer includes a crystal structure that promotes deposition of the subsequent layer of the second material. The crystal structure may be, for example, in the form of a wurtzite crystal structure deposited on the nanostructured layer, such as, but not limited to GaN on ZnO. The crystal structure may be in the form of an additional deposited material that results in a lower deposition stress for the coating of the second material. The lower deposition stress may enable higher operating temperatures than operating temperature for dissimilar crystallographic materials or for a nanostructured material that does not include the crystal structure.

In some embodiments, a nanostructured composition deposited on a substrate as described herein provides desirable optical properties, such as, but not limited to, light absorption, emission, and/or spectral properties, and may be used in an optical application such as modification of optical signature (e.g., radar stealth, license plate applications), as an optical target/reflector, to reduce thermal signature, to promote improved radiative cooling, to promote self cleaning and transmission of light for solar applications, as a colored semitransparent substrate, as an opacity agent (e.g., clear when wet, opaque when dry), and as an indicator of free liquid level.

In some embodiments, a nanostructured composition deposited on a substrate as described herein interacts with light in a photocatalytic manner and may be used in photocatalysis applications such as, but not limited to, water treatment (e.g., incident light may provides an oxygen radical which can be useful for antimicrobial, e.g., antibacterial, purposes), energy harvesting and conversion, (e.g., light to heat, light to oxygen), self-cleaning of organic adsorbed materials, and as a UV protection layer (e.g., sunscreen, packaging to prevent browning).

In some embodiments, a layer that includes one or more catalyst is deposited over a nanostructured composition deposited on a substrate as described herein, to promote catalytic activity on the surface. In one example, the catalyst layer includes a platinum catalyst. Examples of applications in which such a catalyst composition finds use include, but are not limited to, increasing reaction rate for a given surface area.

In some embodiments, a nanostructured composition deposited on a substrate as described herein is deposited in such a manner that the adhesion of frost to the macrostructure of the nanostructured layer is reduced in comparison with adhesion of frost to the substrate without the nanostructured layer or to a similarly deposited non-nanostructured layer. For example, the nanostructured layer may be deposited in such a manner that upon the removal of cooling flux from the layer, the frost more rapidly melts and is dislodged from the surface of the nanostructured layer and the amount of said frost is reduced in comparison to the frost removal rate without the nanostructured layer or to a similarly deposited non-nanostructured layer. Although not wishing to be bound by theory, the frozen water may adopt a different structure due to the morphology of the underlying substrate, making it easier to remove and/or changing the morphology of the ice. Applications in which such reduction of frost may be beneficial include, but are not limited to, refrigeration, air conditioning, air transportation (e.g., airplanes, helicopters), water transportation (e.g., reduction or elimination of ice formation on a ship that makes the ship unstable, for example, imparting a tendency to flip over), power and telephone line ice prevention (e.g., ice storm damage), gutters and flashing (e.g., freezing and then melting under the eaves of homes), cryogenic service equipment, cryogenic vaporizers, compressed gas equipment service equipment, and food service (e.g., ice cream counter). Cooling applications, such as refrigeration or air conditioning may require a heating stage (input of energy) to melt any ice that forms, prevent formation of ice, or promote formation of ice with a lower density which would be beneficial and require less time to melt the ice.

In some embodiments, a layer that includes one or more antimicrobial agent or that imparts or enhances an antimicrobial property is deposited over a nanostructured composition deposited on a substrate as described herein. In some embodiments, the antimicrobial performance of the antimicrobial agent(s) is enhanced in comparison to an identical antimicrobial coating on a non-nanostructured layer. For example, antimicrobial performance may be measured by the degree of cellular lysis of microorganisms. The degree of cellular lysis may be enhanced due to the interaction of the cellular membrane and underlying nanostructure, resulting in stretching of the cell membrane by local stress concentrations from nanostructure and/or surface tension modification of the cell membrane, e.g., owing to charge and roughness of the surface. The antimicrobial layer may include, for example, a biocidal containing material, such as, e.g., a quartanary amine, or an agar material containing growth media, or polydimethylsiloxane (pdms), or any functional material such as a hydrophobic material. The underlying nanostructure may cause straining of the cell membrane, which will result in (a) accelerated cell lysis, or (b) an increased transmembrane flow of beneficial and harmful substances in cell culture. In a nonlimiting example, a petri dish may be coated with a nanostructured material and a thin top coat (e.g., polydimethylsilicone (PDMS) top coat) is used to evaluate cell cultures. A growing cell culture is added to the petri dish in the presence of a salt with a limited rate of uptake by the microorganism. Cells adjacent to the nanostructure (i.e., near the wall of the petri dish), will have an increased rate of uptake of the salt. These cells may exhibit resulting advantageous behavior over a similar culture without a nanostructure. In another example, the rate of cell lysis may be increased for cells in a culture in the presence of a nanostructured surface as compared to cells with in a culture with no nanostructured coating. In another example, cells that excrete an extracellular protein to promote cellular adhesion (e.g., a biofilm), may exhibit increased excretion in the presence of a nanostructure owing to the straining of the membrane (resulting in faster cellular adhesion).

In some embodiments, an antimicrobial layer is deposited over a nanostructured composition deposited on a substrate as described herein, resulting in an interaction between a cellular structure of a microorganism and the nanostructured composition when a cell of a microorganism is in proximity to the nanostructured composition. In one embodiment, the interaction between the cellular structure and the nanostructured composition results in an increased transmembrane flux in comparison to a cell in proximity to a non-nanostructured composition. In one embodiment, a microorganism produces one or more metabolic compound(s) of interest, and the transmembrane flux of the compound(s) is enhanced in comparison to a cell in proximity to a non-nanostructured composition The following examples are intended to illustrate, but not limit, the invention.

EXAMPLES

Example 1

Thin aluminum strips of 3003 Aluminum, 0.016 inch (in.) thick and approximately 3 in. by 1 in. long were tested in duplicate. The strips were submerged in an ultrasonic cleaning bath in deionized (DI) water for 5 minutes to remove the native oxide. The strips were then placed into the production bath containing 20-40 mM metal nitrate and 20-40 mM tertiary amine. The bath was maintained at 55-75° C. throughout the procedure. The strips were placed in the bath for 90-120 minutes. Subsequently, the strips were placed into a 400-550° C. thermal processing treatment for 4 hours (hr). The heating ramp took approximately 1 hr to reach the target temperature. After the thermal processing treatment, the strips were examined for hydrophilicity, by testing with a drop of water. The resulting contact angle were less than 30°. The parts were then placed into a solution containing 1% (w/w) steric acid in hexanes for 15 minutes (min.). The parts were then tested for hydrophobicity by adding drops of water to the surface. The droplets readily rolled or bounced off the surface. Contact angles were estimated to be >160° with contact angle hysteresis <10° (as determined by the angle of the part). The contact angle measured on a bare aluminum strip without nanostructured coating was less than 90°.

Example 2

A 4 in. long section of high temperature adhesive aluminum foil duct tape was tested. The tape was submerged in an ultrasonic cleaning bath in DI water for 5 minutes to remove the native oxide. The tape was then placed into the production bath containing 20-40 mM metal nitrate and 20-40 mM tertiary amine. The bath was maintained at 55-75° C. throughout the procedure. The tape was placed in the bath for 90 minutes. The tape strip was then removed and heated with a thermal gun to a temperature of 200° C. for 1hr. After the thermal processing treatment, the strips were examined for hydrophilicity, by testing with a drop of water. The resulting contact angle was less than 30°. The adhesive backing was then removed and the tape was adhered to a paper plate. A water repellent spray coating for textiles (Scotchguard®) was sprayed on the aluminum tape according to the directions. The parts were then tested for hydrophobicity by adding drops of water to the surface. The droplets demonstrated a contact angle of 140-160°. The droplets were retained on the surface for tilting angles less than <30° (as determined by the angle of the part). Many defects or pinning sites were observed. A droplet retained on one of these sites could be inverted on the plate and tape and would remain in position.

Example 3

Figure 3:
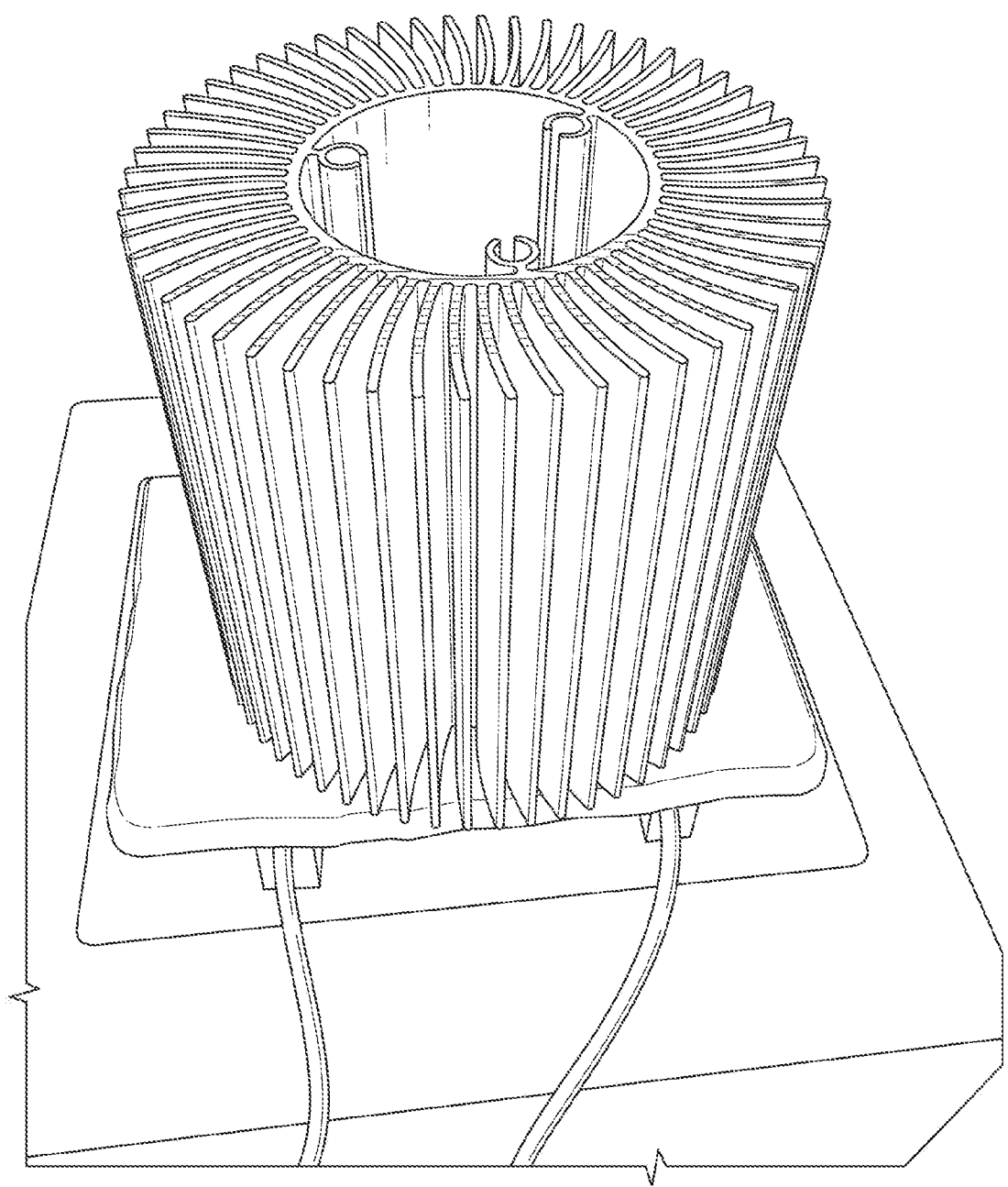
FIG. 3 shows condensation performance in the experiment described in Example 3. A hydrophobic (steric acid treated) surface is shown on the left, a hydrophilic surface is shown on the right, and no treatment is shown on the base plate.

A 3 in. diameter hollow, finned heat sink, approximately 4 in. tall and made of anodized aluminum, was tested. Approximately 50 curved fins ½ in. long, running the length of the heat sink, covered the circumference of the heat sink. The heat sink was submerged in a solution containing 1% (w/w) $NH_3$ and DI water for 30 minutes to remove the external oxide. The sink was then placed into the production bath 20-40 mM metal nitrate and 20-40 mM tertiary amine. The bath was maintained at 55-75° C. throughout the procedure. The sink was placed in the bath for 90-120 minutes. Subsequently, the sink was placed into a 400-550° C. thermal processing treatment for 4 hr. The heating ramp took approximately 1 hr to reach the target temperature. After the thermal processing treatment, the sink were examined for hydrophilicity, by testing with a drop of water. The drop readily wet the complex surfaces. The sink was then partially submerged into a solution containing 1% (w/w) steric acid in hexanes for 15 minutes. The sink was then tested for hydrophobicity by adding drops of water to the surface. The droplets readily rolled or bounced off the surface which was submerged. Some defects at the edges of the part would retain droplets with high contact angle. Areas left exposed from the steric acid solution continued to show good wettability. The sink was then placed onto a thermoelectric Peltier cooler which was provided sufficient power to promote frost formation. Condensation properties for the part were determined by the coverage as can be seen in FIG. 3. Significant frost formation occurred on the base plate of the cooler. However, no frost was observed on the heat sink.

Example 4

Figure 4:
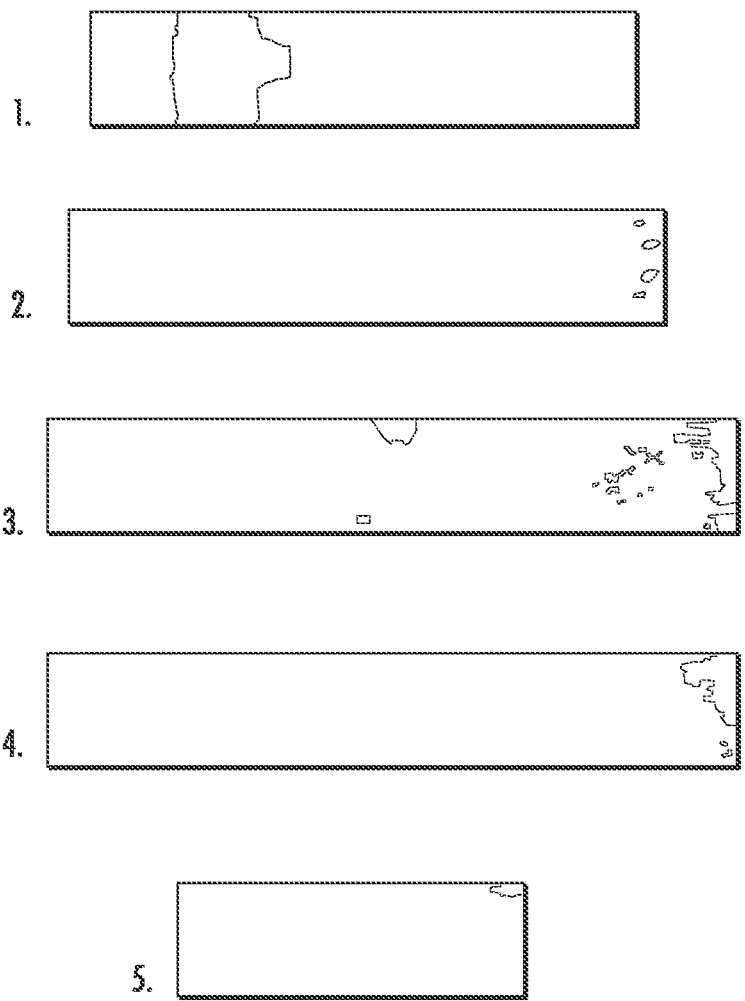
FIGS. 4A-4E show aluminum strips treated as described in Example 4. From top to bottom.

Several thin aluminum strips of 3003 Aluminum, 0.016 in. thick and approximately 3 in. by 1 in. long were tested for compatibility of paint adhesion, as shown in FIGS. 4A-4E. One strip was untreated (FIG. 4A). The remaining strips were submerged in a ultrasonic bath with DI water and 0.4% (w/w) $NH_3$ for 10 minutes to remove the native oxide. The strips were rinsed with DI water and a second strip was removed (FIG. 4B). The remaining strips were then placed into the production bath containing 20-40 mM metal nitrate and a tertiary 20-40 mM tertiary amine. The bath was maintained at 55-75° C. throughout the procedure. The strips were placed in the bath for 90-120 minutes. Another strip (FIG. 4C) was removed. Subsequently, the two remaining strips (FIGS. 4D,4E) were placed into a 400-550° C. thermal processing treatment for 4 hr. The heating ramp took approximately 1 hr to reach the target temperature. After the thermal processing treatment, one strip (FIG. 4D) was removed. This strip (FIG. 4D) strip was examined for hydrophilicity, by testing with a drop of water. The resulting contact angle was less than 30°. The remaining strip (FIG. 4E) was then placed into a solution containing 1% (w/w) steric acid in hexanes for 15 minutes. The strip (FIG. 4E) was then tested for hydrophobicity by adding drops of water to the surface. The droplets readily rolled or bounced off the surface. Contact angles were estimated to be >160° C. with contact angle hysteresis <10° (as determined by the angle of the part). Each of the parts was lightly coated with two layers of red, semigloss, spray enamel paint designed for metal painting, including aluminum, in accordance with the instructions (Orchard Supply Hardware). The painted samples were allowed to dry. 48 hr later, each of the parts was scored in a cross pattern with a razor blade. The scoring was sufficiently deep to visually observe the aluminum substrate. Scotch® Magic™ matte tape (¾ in) was placed atop each of the 5 samples and adhered with a rubber eraser to ensure strong contact. The tape was peeled back making an approximate 60° angle from the strip. Sample 2A demonstrated a major delamination. No delamination or damage was observed in the remaining samples (FIGS. 4B, 4C, 4D, 4E). A second round of testing was carried out with a crossed gridded pattern with a pair of with two sets of 4 parallel lines spaced approximately ¹⁄₁₆ in. using a new razor blade. Another round of tape adhesion testing was carried out using a 1 in. wide strip of Gorilla Tape® (#1899). The tape was adhered with a rubber eraser as described above and pulled in the same manner. Sample 4B did not demonstrate any delamination, and some minor amounts of adhesive residue remained on the end of the sample. Sample 4C showed some major failures paint delamination as shown and some minor amounts of adhesive residue remained on the sample. Sample 4D showed no paint delamination and major amounts of adhesive residue remained on the sample. Sample 4E showed minor paint delamination in the grid and no adhesive residue remained.

Example 5

Figure 5:
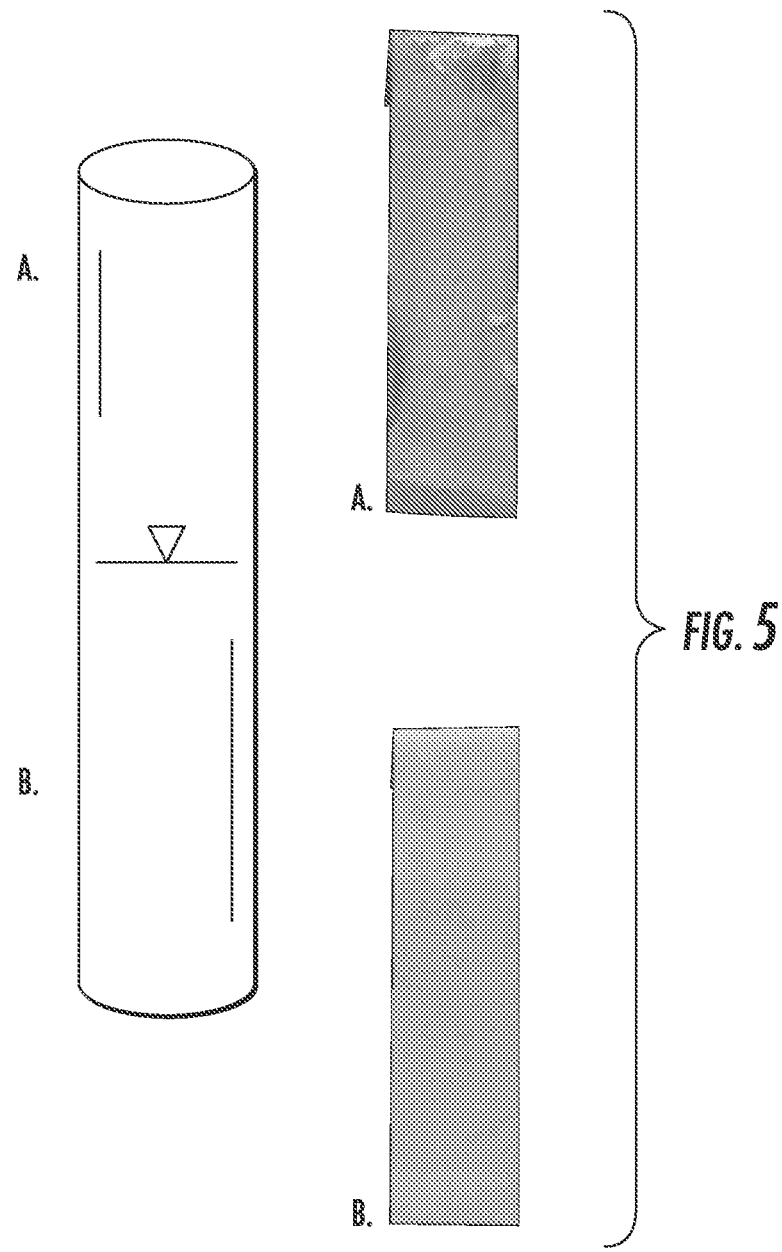
FIGS. 5A-5B show aluminum strips tested with as described in Example 5. From top to bottom.
Figure 6A:
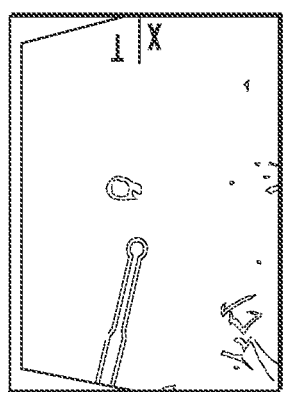
FIGS. 6A-6H show droplets interacting with an angled aluminum plate that has been partially exposed to UV radiation.
Figure 6B:
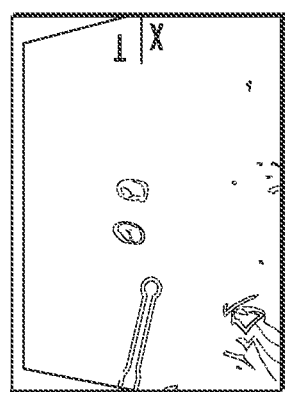
Figure 6C:
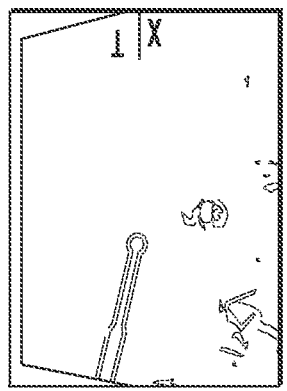
Figure 6D:
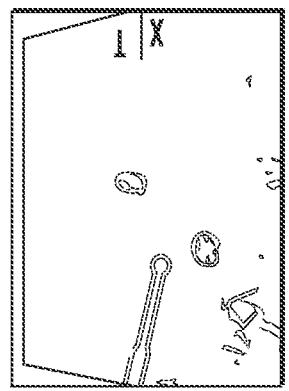
Figure 6E:
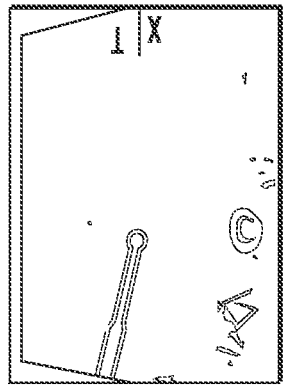
Figure 6F:
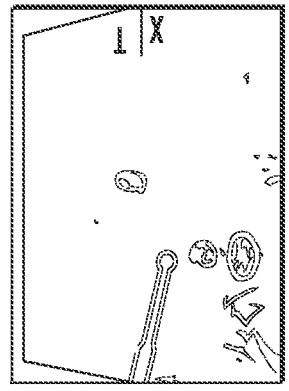
Figure 6G:
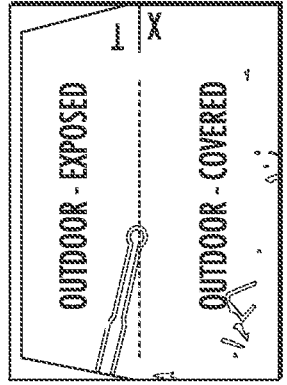
Figure 6H:
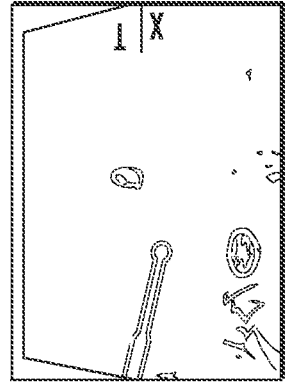

Thin aluminum strips of 3003 Aluminum, 0.016 in. thick and approximately 3 in. by 1 in. long were tested in duplicate. Pairs of strips were submerged in solutions containing 1% $NH_3$ (w/w) and DI water for 15 minutes to remove the native oxide. The strips were then placed into the production bath containing 20-40 mM metal nitrate and 20-40 mM tertiary amine. The bath was maintained at 55-75° C. throughout the procedure. The strips were placed in the bath for 90-120 minutes. Subsequently, the strips were placed into a 400-550° C. thermal processing treatment for 4 hr. The heating ramp took approximately 1 hr to reach the target temperature. After the thermal processing treatment, the strips were examined for hydrophilicity, by testing with a drop of water. The resulting contact angles were less than 30°. The parts were then placed into a solution containing 1% (w/w) steric acid in hexanes for 15 minutes. The parts were then tested for hydrophobicity by adding drops of water to the surface. The droplets readily rolled or bounced off the surface. Contact angles were estimated to be >160° C. with contact angle hysteresis <10° (as determined by the angle of the part). 250 ml of seawater collected from the San Francisco Bay at the brine ponds in Hayward, Calif. was placed into a 500 ml polypropylene graduated cylinder. An ultrasonic mist generator was placed in the liquid portion of the cylinder. One of the strips was placed at the top rim of the graduated cylinder in contact with the ultrasonic salt fog mist. The other was submerged in the sea water. The cylinder was covered with aluminum foil and the ultrasonic mister was powered. After 2.5 days, the liquid level had dropped by half and an additional 125 ml of liquid was added. The solution temperature was measured at 63° C. The parts were left for another 3.5 days (6 days total). The results are shown in FIGS. 5A and 5B. Some salt fouling was observed in the upper sample (5A), however no delamination or degradation of the coating or any signs of corrosion of the aluminum were observed for the strip shown in 5B.

Example 6

3 in.×3 in. aluminum sheets, 0.062 in. thick, were submerged in an ultrasonic cleaning bath in DI water for 5 minutes and subsequently into a basic solution of pH 12 for 10 minutes and rinsed. The sheets were then placed into the production bath containing 20-40 mM metal nitrate and 20-40 mM tertiary amine. The bath was maintained at 55-75° C. throughout the procedure. The strips were placed in the bath for 90-120 minutes. Subsequently, the strips were placed into a 400-550° C. thermal processing treatment for 4 hr. The heating ramp took approximately 1 hr to reach the target temperature. After the thermal processing treatment, the sheets were examined for hydrophilicity, by testing with a drop of water. The resulting contact angle were less than 30°. The parts were then placed into a solution containing 1% (w/w) steric acid in hexanes for 15 minutes. The parts were then tested for hydrophobicity by adding drops of water to the surface. The droplets readily rolled or bounced off the surface. Contact angles were estimated to be >160° C. with contact angle hysteresis <10° (as determined by the angle of the part). The contact angle measured on a bare aluminum strip without nanolayer coating was less than 90°. One of these sheets was subjected to ASTM testing standard D3363-05. The test resulted in a Gouge hardness rating of F on a scale from 6B to 6H. Another of the sheets was subjected to ASTM testing standard D3359-09 Method B. The test resulted in a tape adhesion rating of 5B, showing edges are completely smooth, with no squares detached.

Example 7

A 1 in. by 3 in. strip of 3003 aluminum was coated with a commercially available product (NeverWet®) according to the directions. A 3 in.×3 in. aluminum sheet, 0.062 in. thick, was submerged in an ultrasonic cleaning bath in DI water for 5 minutes and subsequently into a basic solution of pH 12 for 10 minutes and rinsed. The sheets were then placed into the production bath containing 20-40 mM metal nitrate and 20-40 mM tertiary amine. The bath was maintained at 55-75° C. throughout the procedure. The strips were placed in the bath for 90-120 minutes. Subsequently, the strips were placed into a 400-550° C. thermal processing treatment for 24 h. The heating ramp took approximately 1 hr to reach the target temperature. After the thermal processing treatment, the sheets were examined for hydrophilicity, by testing with a drop of water. The resulting contact angle were less than 30°. The parts was then coated with the second part of the NeverWet® product. The parts were then tested for hydrophobicity by adding drops of water to the surface. The droplets readily rolled or bounced off the surface. Contact angles were measured to be 161° for the NeverWet® multi-surface product. The product is a two-step product system designed to create a moisture repelling barrier on a variety of surfaces. An aluminum sheet with the nanostructured coating described herein, and application of just step 2 of the NeverWet® product had an estimated contact angle of 170°. Additional data for comparing the two surfaces is shown below in Table 1.

TABLE 1

| [deg]<br>N = 5 | Contact angle with water | |
|---|---|---|
| | NeverWet ® multi-<br>surface 2-step coating | Nanostructured coating<br>and NeverWet ® step 2 |
| Average | 161 | 170 |
| Improvement | | +9 |
| Max | 165 | 174 |
| Min | 159 | 168 |
| Standard<br>Deviation | 2.1 | 2.6 |

Example 8

Thin aluminum strips of 3003 Aluminum, 0.016 inch (in.) thick and approximately 3 in. by 1 in. long were tested in duplicate. The strips were submerged in an ultrasonic cleaning bath in deionized (DI) water for 5 minutes to remove the native oxide. The strips were then placed into the production bath containing 20-40 mM metal nitrate and 20-40 mM tertiary amine. The bath was maintained at 55-75° C. throughout the procedure. The strips were placed in the bath for 90-120 minutes. Subsequently, the strips were placed into a 400-550° C. thermal processing treatment for 4 hours (hr). The heating ramp took approximately 1 hr to reach the target temperature. After the thermal processing treatment, the strips were examined for hydrophilicity, by testing with a drop of water. The resulting contact angle were less than 30°. The parts were then placed into a solution containing 1% (w/w) steric acid in hexanes for 15 minutes (min.). The parts were then tested for hydrophobicity by adding drops of water to the surface. The droplets readily rolled or bounced off the surface. Contact angles were estimated to be >160° with contact angle hysteresis <10° (as determined by the angle of the part). The contact angle measured on a bare aluminum strip without nanostructured coating was less than 90°. One of the coated strips was placed into 250 ml of San Francisco Bay water collected in Fremont, Calif. for a period of 5 days at 140-150° F. The samples and solution were maintained in a foil covered, graduated cylinder which contained the samples, Bay water, and an ultrasonic transducer designed to generate a salt fog above the liquid level. After 2.5 days, an additional 125 ml of sample water was added to the existing material to replenish the level. No corrosion was observed on the coated aluminum sample (FIG. 5B). Excessive oxidation was observed on the aluminum foil covering the experiment. Another of the coated strips was placed into the upper portion of the reactor containing a salt fog solution of the San Francisco Bay water for a period of 5 days at 140-150° F. (FIG. 5A). Some salt deposits were noted on the sample, but no signs of corrosion were observed on the coated aluminum sample. The sample was further tested with ASTM B117 and no corrosion was observed after 2 weeks. The aluminum control was corroded.

Example 9

An aluminum plate was cleaned with isopropanol and dipped in dilute sodium hydroxide to further prepare the surface. The plate was then placed in a production bath containing 20-50 mM of metal nitrate and 40 mM of HMTA. The bath was maintained at 50-90° C. for 60 to 120 minutes. The strips were then placed into a 300-550° C. furnace for 4 hours. The strips were then placed into a 1% aqueous solution of Dimethyloctadecyl[3-(trimethoxysilyl)propyl] ammonium chloride (DTSACI)for 24 hours and then rinsed in deionized water. The resulting nanostructured base coat enhances the antibacterial properties, liquid crystal orientation ability, and antistatic properties of DTSACI.

Example 10

An aluminum plate was cleaned with isopropanol and dipped in dilute sodium hydroxide to further prepare the surface. The plate was then placed in a production bath containing 20-50 mM of metal nitrate and 40 mM of HMTA. The bath was maintained at 50-90° C. for 60 to 120 minutes. The strips were then placed into a 300-550° C. furnace for 4 hours. The strips were then placed into a 1% aqueous solution of BIS[(3-METHYLDIMETHOXYSILYL)PROPYL]POLYPROPYLENE OXIDE for 24 hours and then rinsed in deionized water. The resulting nanostructured base coat imparted enhanced hydrophilicity relative to the top coat without the nanostructure.

Example 11

An aluminum foam is cleaned with isopropanol and dipped in dilute sodium hydroxide to further prepare the surface. The foam is then placed in a production bath containing 20-50 mM of metal nitrate and 40 mM of HMTA. The bath is maintained at 50-90° C. for 60 to 120 minutes. The foam is then placed into a 300-550° C. furnace for 4 hours. The coated aluminum foam is then coated with an a material, such as lithium, carbon, tin,iron oxide, aluminum, copper, cobalt, nickel or manganese. Alternatively, the substrate is coated with an electrolyte, metallization, ionic separator, or electrode. The nanostructured base coat imparts enhanced performance of a electrochemical cell relative to a cell created without the nanostructured base coat material.

Example 12

An anodized aluminum part is cleaned with isopropanol and dipped in dilute ammonia to further prepare the surface. The part is then placed in a production bath containing 20-50 mM of metal nitrate and 40 mM of HMTA. The bath is maintained at 50-90° C. for 60 to 120 minutes. The part is then placed into a 300-550° C. furnace for 4 hours. The coated aluminum part is then coated with a hydrophobic material, steric acid, in solvent for several minutes. The nanostructured base coat imparts enhanced performance of hydrophobicity relative to a part created without the nanostructured base coat material.

Example 13

Aluminum samples were prepared in accordance with the process described in Example 1 to evaluate their ability to remove adhered organic material. The samples were then subject to indoor and outdoor light exposure. The outdoor samples, were mounted facing toward the Sun. One side of the outdoor samples were loosely covered in aluminum foil to block UV exposure. The samples were tested Jun. 16-22, 2016 in Palo Alto, Calif. The indoor samples were subject to standard compact fluorescent office lighting, with an equivalent UV dose less than 1% of the outdoor samples for the same period.

The contact angle and apparent rolling angle of the samples were measured and compared to freshly prepared control samples. The results are in Table 2.

TABLE 2

|  | Freshly prepared control | Indoor sample | Outdoor sample - exposed | Outdoor sample - foil covered |
|---|---|---|---|---|
| Contact angle | >160° | >160° | 90-110° | >150° |
| Rolling angle | <10° | <10° | Pinned | <10° |

Water droplets placed on the exposed UV outdoor sample showed the surface to be less hydrophobic and would not roll from the surface. The outdoor foil covered sample areas showed some minor degradation which appears to be from sample handling, rather than UV degradation. FIGS. 6A-6H demonstrate these results.

Example 14

An aluminum part is cleaned with isopropanol and dipped in dilute ammonia to further prepare the surface. The part is then placed in a production bath containing 20-50 mM of metal nitrate and 40 mM of HMTA. The bath is maintained at 50-90° C. for 60 to 120 minutes. The coated part is then placed into a solution of sodium dodecylsulfate with an optional electrical bias to replace intercalated nitrate anions with sodium dodecylsulfate. The substrate is then optionally heated to a temperature between 150 C and 600 C to remove the organic material and result in sodium containing metal oxides. This substrate is then used as an electrode.

Although the foregoing invention has been described in some detail by way of illustration and examples for purposes of clarity of understanding, it will be apparent to those skilled in the art that certain changes and modifications may be practiced without departing from the spirit and scope of the invention. Therefore, the description should not be construed as limiting the scope of the invention.

All publications, patents, and patent applications cited herein are hereby incorporated by reference in their entireties for all purposes and to the same extent as if each individual publication, patent, or patent application were specifically and individually indicated to be so incorporated by reference.

We claim:

1. A method for producing a coated substrate, comprising:
 (a) immersing the substrate in an aqueous solution that comprises one or more dissolved metal salt(s) at a temperature from about 50° C. to about 90° C., under conditions such that a nanostructured layer is deposited on the substrate, thereby producing a coated substrate, wherein the aqueous solution comprises $2^+$ and/or $3^+$ ion(s) of one or more first metal(s), wherein the $2^+$ and/or $3^+$ first metal ion(s) are derived from the one or more dissolved metal salt(s), and wherein the nanostructured layer comprises one or more of the $2^+$ and/or $3^+$ first metal ion(s) from the aqueous solution, and wherein the substrate comprises one or more second metal(s) with $2^+$ and/or $3^+$ primary oxidation state, wherein the first metal(s) and the second metal(s) are different, and wherein the nanostructured layer comprises one or more $2^+$ and/or $3^+$ ion(s) of the second metal(s) from the substrate;

(b) separating the coated substrate comprising the nanostructured layer from the solution;

(c) treating the coated substrate to stabilize the nanostructured layer and/or to prepare the nanostructured layer for subsequent processing, wherein step (c) comprises one or more processing steps to replace anionic and/or cationic components of the coated substrate, or comprises thermal processing, oxidation, or reduction of the coated substrate; and (d) depositing one or additional material(s) onto the nanostructured layer that enhances the performance of an electrochemical cell, in comparison to an identical electrochemical cell that does not comprise the nanostructured layer, wherein the one or more additional material(s) comprises copper, cobalt, nickel, manganese, and/or alloys thereof.

2. A method according to claim 1, wherein the aqueous solution comprises: (i) said one or more $2^+$ and/or $3^+$ first metal ion(s), and (ii) one or more agent selected from a buffering agent, a reducing agent, a catalyst, and a surfactant.

3. A method according to claim 1, wherein the one or more second metal(s) with $2^+$ and/or $3^+$ primary oxidation state are selected from Zn, Mn, Mg, Mo, Fe, Cd, Al, Cr, Ni, Co, Ti, and Ga.

4. A method according to claim 1, wherein the one or more $2^+$ and/or $3^+$ first metal ion(s) are selected from $Zn^{2+}$, $Mn^{2+}$, $Mg^{2+}$, $Ni^{2+}$, $Mo^{2+}$, $Fe^{2+}$, $Cd^{2+}$, $Al^{3+}$, $Fe^{3+}$, $Cr^{3+}$, $Mn^{3+}$, $Ni^{3+}$, $Co^{3+}$, $Ti^{3+}$, and $Ga^{3+}$.

5. A method according to claim 1, wherein the nanostructured layer comprises anionic and/or cationic components, wherein the method further comprises one or more process step(s) to replace or exchange the anionic and/or cationic components.

6. A method according to claim 5, wherein the anionic and/or cationic components are replaced with inorganic or organic atoms, molecules, different anions and/or cations, complex biomolecules, or intercalated anionic and/or cationic components.

7. A method according to claim 1, wherein the aqueous solution comprises one or more of urea, hexamethylenetetramine, sodium alginate, ammonia, and persulfate.

8. A method according to claim 1, wherein the dissolved metal salt(s) in step (a) comprise one or more of nitrate, phosphate, sulfate, chloride, formate, citrate, and acetate salt(s) of said first metal(s).

9. A method according to claim 1, wherein step (a) further comprises application of an external voltage bias and/or agitation.

10. A method according to claim 1, wherein step (c) comprises thermal processing, comprising heating to a temperature of about 100° C. to about 600° C. for about 0.1 hour to about 48 hours.

11. A method according to claim 1, wherein the nanostructured layer comprises layered double hydroxide sub-units that comprise a plurality of layers, wherein each layer comprises metal hydroxide(s) of $2^+$ and/or $3^{30}$ ion(s) of the first metal and/or the second metal, with one or more anion(s) between the layers.

12. A method according to claim 11, wherein the treating the coated substrate in step (c) converts the metal hydroxide(s) to metal oxide(s).

13. A method according to claim 1, wherein the substrate comprises an aluminum alloy, a nickel alloy, stainless steel, a semiconductor, glass or other amorphous solid, or crystalline ceramic.

14. A method according to claim 1, wherein the aqueous solution comprises $Zn^{2+}$ and the substrate comprises aluminum.

* * * * *